Patented Mar. 11, 1941

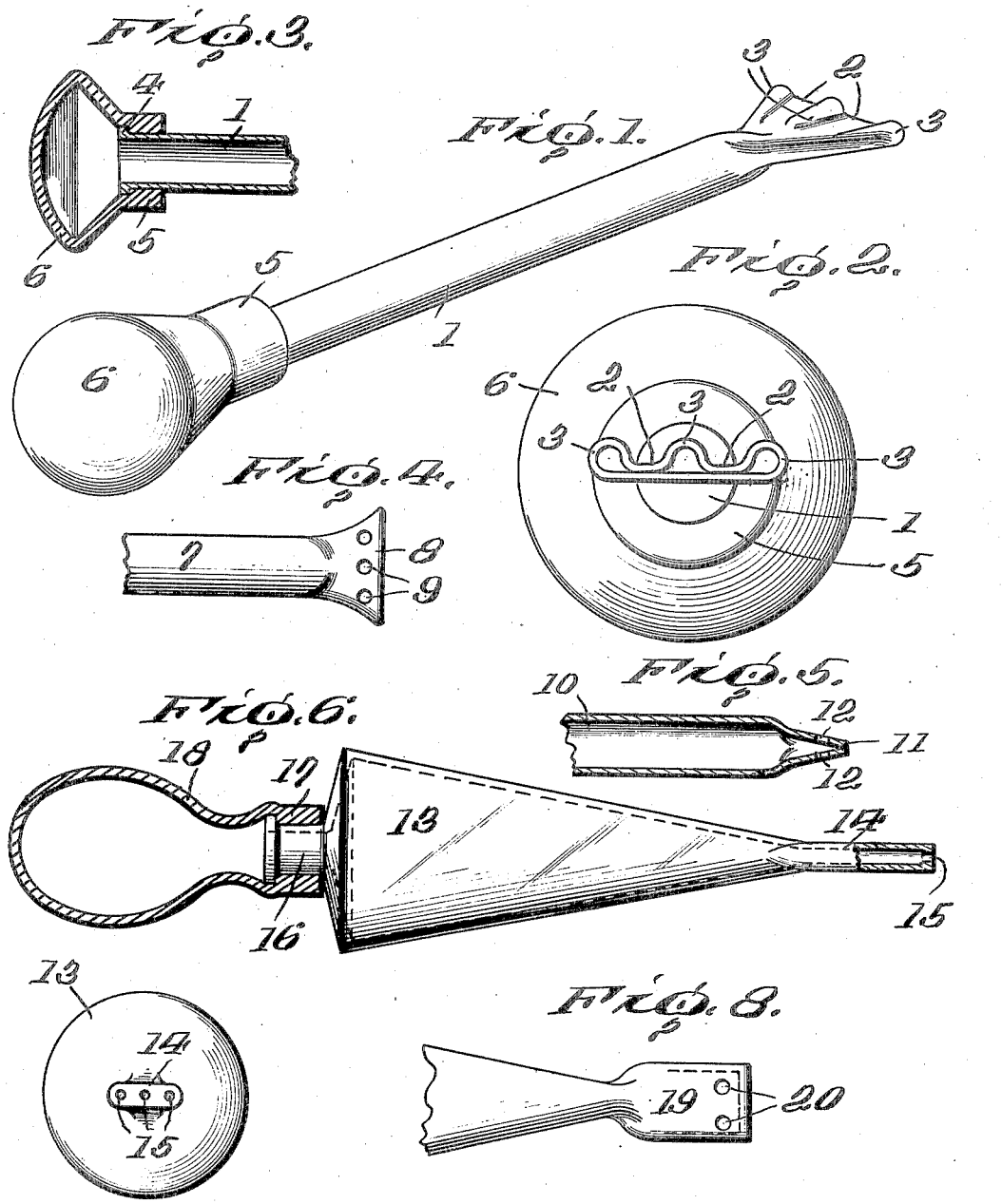

2,234,884

UNITED STATES PATENT OFFICE 2,234,884

BASTING DEVICE

Florence M. Teel, Hazleton, Pa.

Application March 3, 1939, Serial No. 259,710

1 Claim. (Cl. 299—90)

This invention relates to certain new and useful improvements in kitchen utensils and more particularly to a basting device, the object being to provide a device which is so constructed that the liquid used for basting a roast of meat or a fowl or the like can be drawn within the same by suction and expelled therefrom so as to spray the liquid over the article being cooked.

Another object of my invention is to provide a device which is exceedingly simple and cheap in construction and one which can be formed of any suitable material, such as metal or glass, the same being provided with a flattened end which enables it to be forced under the article being cooked so as to draw the basting fluid into the same in which it will be retained until a pressure is exerted against a rubber bulb forming the suction device, whereupon the fluid can be readily sprayed over the article being cooked so as to equally distribute the same, thereby overcoming the difficulties existing with using a ladle or a spoon for basting purposes.

It has been found in practice that it is very difficult to baste an article when being roasted as it is hard to dip the basting fluid from the pan, especially when the article being cooked is of such a size that it practically fills the pan and in most instances the housewife or chef does not desire to have an excess amount of basting fluid and in either case, it is hard to not only dip the fluid from the pan but to distribute it equally over the article being cooked.

A device constructed in accordance with my invention can be inserted into the pan or under the article being cooked so that the basting fluid can be readily drawn therein and after it has been drawn into the receptacle of the device, it will remain until the device has been positioned over the article being roasted where it can be sprayed so as to equally distribute the same.

Other and further objects and advantages of the invention will be hereinafter set forth and the novel features thereof defined by the appended claim.

In the drawing—

Figure 1 is a perspective view of a basting device embodying one form of my invention;

Figure 2 is an end view;

Figure 3 is a detail view showing the rubber suction bulb in position over the end thereof;

Figure 4 is a detail view showing apertures arranged in the under side of the flattened portion;

Figure 5 is a detail view of a modified form showing apertures arranged in both sides of the flattened portion;

Figure 6 is a side elevation partly in section showing a tapering tube formed of glass or the like;

Figure 7 is an end view of the same; and

Figure 8 is a detail view of a slightly modified form showing apertures arranged in the side of the flattened portion.

In the embodiment of my invention as shown in Figures 1 to 3, I employ a tubular member 1 formed of metal having a flattened end portion provided with ribs 3 having open ends as clearly shown in Figure 2. The opposite end of the tubular member 1 is provided with a flange 4 over which is arranged a neck 5 of a rubber suction bulb 6.

In the modification shown in Figure 4, the tubular member 7 is provided with a flattened end 8 having apertures 9 in one side thereof through which the fluid is adapted to be drawn and expelled in the operation of the device.

In the modification shown in Figure 5, the tube 10 is provided with a flattened portion 11 having the side walls provided with apertures 12.

In the embodiment of my invention shown in Figures 6 and 7, the tubular body 13 is formed of glass or any other analogous material and is tapering and terminates in a flattened portion 14 having apertures 15 in the end thereof. The opposite end of the tapering tubular member 13 is provided with a flanged stem 16 over which is arranged the neck portion 17 of a rubber suction bulb 18.

In the modification shown in Figure 8, the flattened portion 19 of the construction shown in Figures 6 and 7 is provided with apertures 20 in its side for drawing and expelling the basting fluid.

While in the drawing I have shown several embodiments of my invention, I wish it to be understood that my invention consists broadly in providing a basting device comprising a hollow body having a flattened apertured end portion through which the fluid is drawn and expelled by a rubber suction bulb disposed over the opposite end of the body and the particular position of the apertures is immaterial so long as these apertures are arranged at the end or adjacent the end of the flattened portion to enable the basting fluid to be readily withdrawn from the bottom of the pan.

The flattened end portion can be provided with apertures in its ends, apertures in one side wall or apertures in both side walls and the end and therefore I wish to reserve the right to form the device with apertures in the different positions so long as they are arranged adjacent the flattened end portion.

In the operation of my device the flattened end is forced into engagement with the bottom of the pan in which a roast or fowl is being cooked and if desired, can be forced under the fowl or roast. By compressing the bulb and releasing the same, fluid in the bottom of the pan will be drawn into the hollow body of the device and the device is then positioned over the fowl or roast and by squeezing the bulb, the basting fluid will be sprayed over the fowl or roast.

From the foregoing description it will be seen that I have provided a very novel and simple form of basting device whereby the fluid can be drawn into a receptacle and expelled therefrom to thoroughly baste the article being cooked and while I have shown various forms, I do not wish to limit myself to any particular shape of the device as I am aware that various shapes can be used in constructing the device without departing from the spirit of my invention.

What I claim is:

A basting device comprising a tubular member having a flattened expanded end portion to provide a contracted flat face having hollow ribs forming passages communicating with the flattened portion, and a rubber bulb arranged over the other end of the tubular member.

FLORENCE M. TEEL.